United States Patent [19]

Takenaka

[11] Patent Number: 5,600,556
[45] Date of Patent: Feb. 4, 1997

[54] WORD PROCESSOR THAT AUTOMATICALLY CAPITALIZES THE FIRST LETTER OF SENTENCE

[75] Inventor: Shunpei Takenaka, Yamato, Japan

[73] Assignee: Canon Kabushiki Kaisha, Tokyo, Japan

[21] Appl. No.: 164,836

[22] Filed: Dec. 9, 1993

Related U.S. Application Data

[63] Continuation of Ser. No. 608,013, Nov. 1, 1990, abandoned, which is a continuation of Ser. No. 270,379, Nov. 10, 1988, abandoned, which is a continuation of Ser. No. 903,827, Sep. 3, 1986, abandoned, which is a continuation of Ser. No. 460,825, Jan. 25, 1983, abandoned.

[30]   Foreign Application Priority Data

Jan. 29, 1982  [JP]  Japan ................................. 57-11784
Jan. 29, 1982  [JP]  Japan ................................. 57-11788
Jan. 30, 1982  [JP]  Japan ................................. 57-12535

[51] Int. Cl.⁶ ............................................ G06F 17/21
[52] U.S. Cl. ............................................ 395/803
[58] Field of Search .................... 400/94, 252, 251; 395/425; 364/419.1, 419.14, 419.15

[56]   References Cited

U.S. PATENT DOCUMENTS

| | | | |
|---|---|---|---|
| 3,969,698 | 7/1976 | Bollinger et al. | 382/40 |
| 3,969,700 | 7/1976 | Bollinger et al. | 382/40 |
| 4,158,236 | 6/1979 | Levy | 364/900 |
| 4,290,105 | 9/1981 | Cichelli et al. | 364/200 |
| 4,355,370 | 10/1982 | Yanagiuchi | 364/900 |
| 4,355,913 | 10/1982 | Rutkowski, Jr. | 400/63 |
| 4,383,307 | 5/1983 | Gibson, III | 364/900 |
| 4,408,192 | 10/1983 | Ward et al. | 340/407 |
| 4,471,459 | 9/1984 | Dickinson et al. | 364/900 |
| 4,531,201 | 7/1985 | Skinner, Jr. | 364/900 |
| 4,772,145 | 9/1988 | Takada | 400/315 |
| 4,804,279 | 2/1989 | Berkelmans et al. | 400/482 |

FOREIGN PATENT DOCUMENTS 55-166734  12/1980  Japan .

OTHER PUBLICATIONS

Communications of the ACM, "Computer Programs for Detecting and Correcting Spelling Errors", J. Peterson vol. 23, p. 676, 1980.
The Computer Journal, "A Binary n–Gram Technique for Automatic Correction of Substitution, Delection, Insertion, and Reversal Errors in Words", J. Ullman, vol. 20, p. 141, 1977.
Communications of the ACM, "Spelling Correction in System Programs", H. Morgan, vol. 13, p. 90, 1970.
Communications of the ACM, "A Technique for Dectecting and Correction of Spelling Errors", F. Damerau, vol. 7, p. 171, 1964.

*Primary Examiner*—Eddie P. Chan
*Assistant Examiner*—Kevin L. Ellis
*Attorney, Agent, or Firm*—Fitzpatrick, Cella, Harper & Scinto

[57]   ABSTRACT

In a word processor which processes an input alphabetic text entered through a keyboard, a character code representing a character at a beginning of an input text is translated to an upper case letter code. Also, two consecutive characters of an input word are exchanged to determine if the modified word after the exchange is a correct word and characters in an input word may be substituted to determine if the modified word after substitution is a correct word.

2 Claims, 14 Drawing Sheets

131

| A | O |
|---|---|
| B | O |
| C | O |
| D | O |
| E | O |
| F | O |
| G | O |
| H | I |
| I | I |
| J | I |
| K | I |
| L | I |
| M | I |

| N | I |
|---|---|
| O | I |
| P | I |
| Q | O |
| R | O |
| S | O |
| T | O |
| U | I |
| V | O |
| W | O |
| X | O |
| Y | I |
| Z | O |

He who coems$^{W_3}$ from above is ⋯⋯

231

| a |   |
|---|---|
| b | n |
| c |   |
| d | k |
| e | i |
| f | j |
| g | h |
| h | g |
| i | e |
| j | f |
| k | d |
| l | s |
| m | v |

| n | b |
|---|---|
| o | w |
| p | q |
| q | p |
| r | u |
| s | l |
| t | y |
| u | r |
| v | m |
| w | o |
| x |   |
| y | t |
| z |   |

He who comes  fuom  above is  .....
                  ⌐W₄

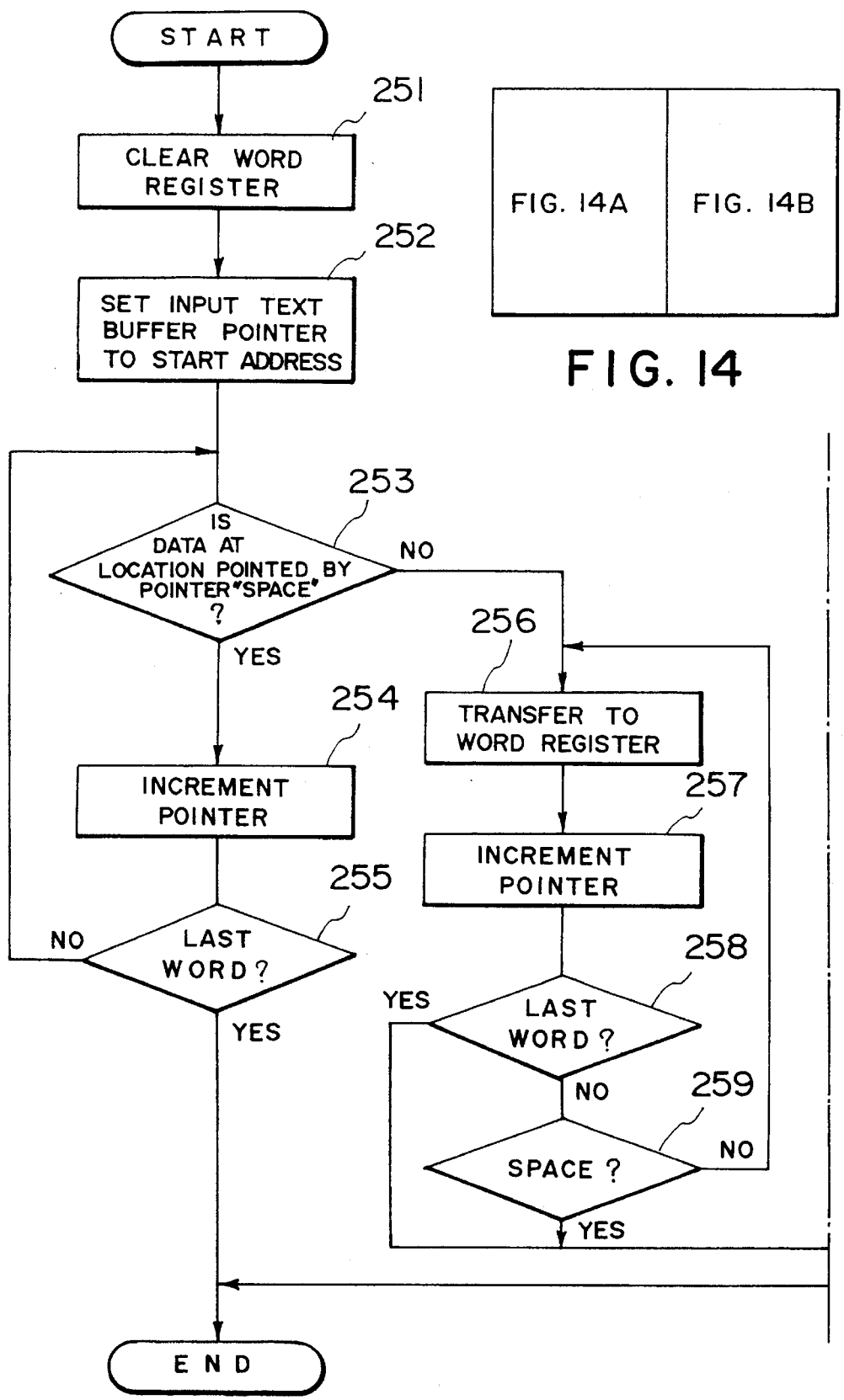
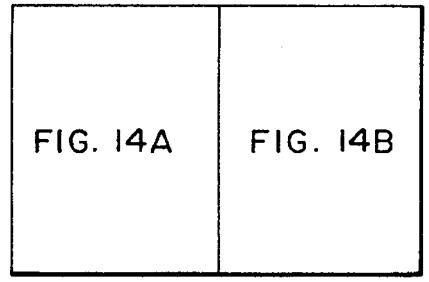
FIG. 14A
FIG. 14

WORD PROCESSOR THAT AUTOMATICALLY CAPITALIZES THE FIRST LETTER OF SENTENCE

This application is a continuation of application Ser. No. 07/608,013 filed Nov. 1, 1990, now abandoned, which is a continuation of application Ser. No. 07/270,379 filed Nov. 10, 1988, now abandoned, which is a continuation of application Ser. No. 06/903,827 filed Sep. 3, 1986, now abandoned, which is a continuation of application Ser. No. 06/460,825 filed Jan. 25, 1983 now abandoned.

BACKGROUND OF THE INVENTION

1. Field of the Invention

The present invention relates to a word processor, and more particularly to a word processor capable of enhancing operability.

2. Description of the Prior Art

Many word processors capable of inputting western language texts have been known. It is a practice in the western language texts to use a capital letter at the beginning of a sentence. Accordingly, it is necessary to depress a shift key to input a first character of the sentence. This has been a burden to an operator when he or she inputs the text. It is necessary to depress the shift key at the beginning of the sentence and release the shift key for the following characters. As a result, the character input rate at the beginning of the sentence is reduced.

In a prior art word processor in which a text is entered by operating a keyboard, spelling of a word is looked up in a lexicon when an input error is to be corrected. If the word in question is not found in the lexicon, a word having similar spelling is merely substituted. As a result, words frequently cannot be defined uniquely.

It is an object of the present invention to provide a word processor having a function of automatically shifting to an upper case letter at the beginning of a sentence and automatically resetting to a lower case letter.

It is another object of the present invention to provide a word processor capable of correcting an input error resulting from character substitution or character transposition.

It is a further object of the present invention to provide a word processor which checks spelling of a word input by a keyboard and corrects an erroneous input word resulting from character substitution or character transposition by exchanging portions thereof, to determine if the input word is in error or not.

The above and other objects of the present invention will be apparent from the following description of the preferred embodiments of the invention taken in conjunction with the accompanying drawings.

BRIEF DESCRIPTION OF THE DRAWINGS

FIG. 14 shows how FIGS. 14A and 14B are assembled to form a flow chart for operation of the device shown in FIG. 12.

DETAILED DESCRIPTION OF THE PREFERRED EMBODIMENTS

Figure 1:
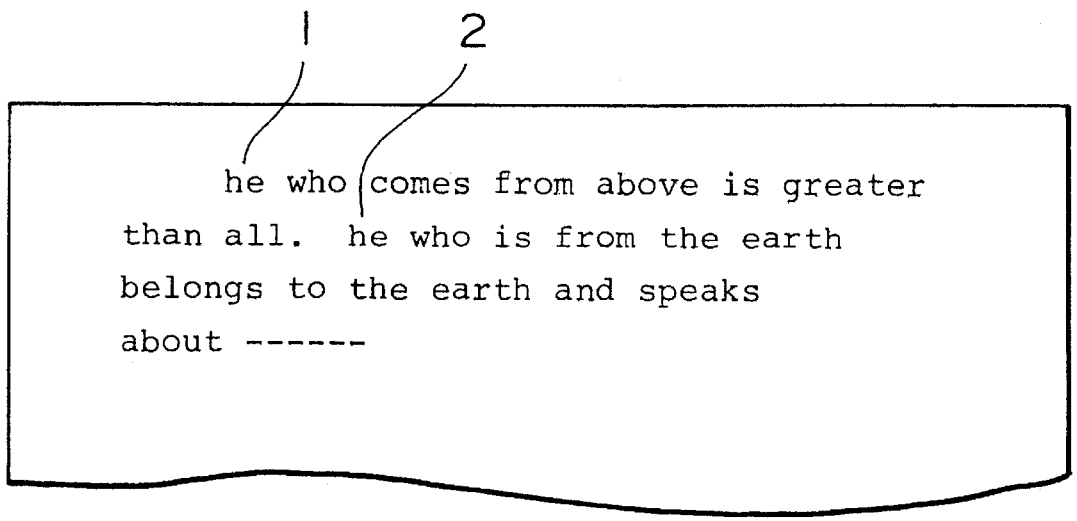
FIG. 1 shows an example of input stroke data.
Figure 2:
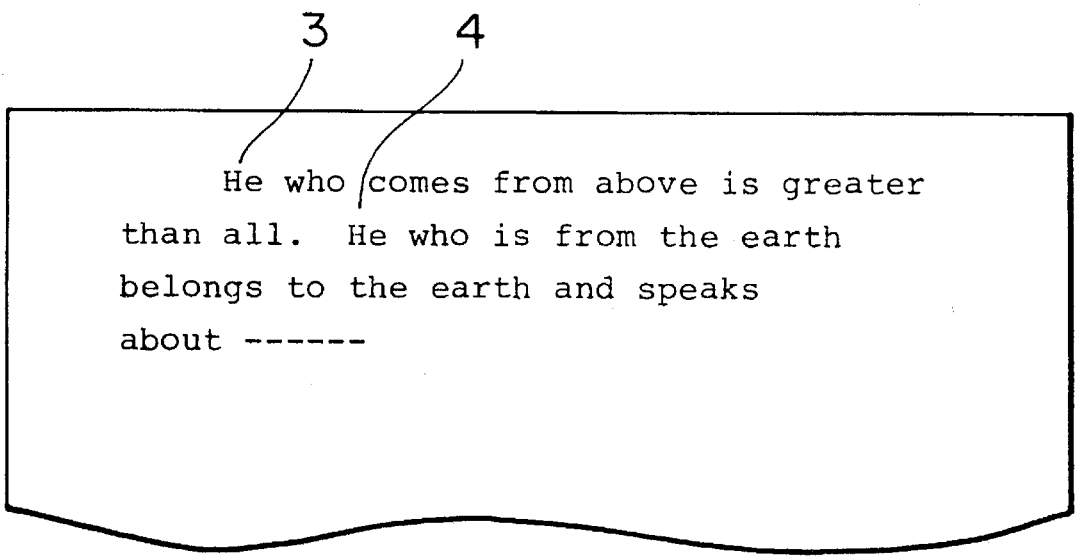
FIG. 2 shows output data after processed in accordance with the data shown in FIG. 1.

FIG. 1 shows input stroke data to be entered by an operator. Beginning-of-sentence characters 1 and 2 are input as lower case letters. FIG. 2 shows output data resulting after the input data has been processed by the word processor of the present invention. As seen from FIG. 2, the beginning-of-sentence characters have been changed to upper case letters 3 and 4.

Figure 3:
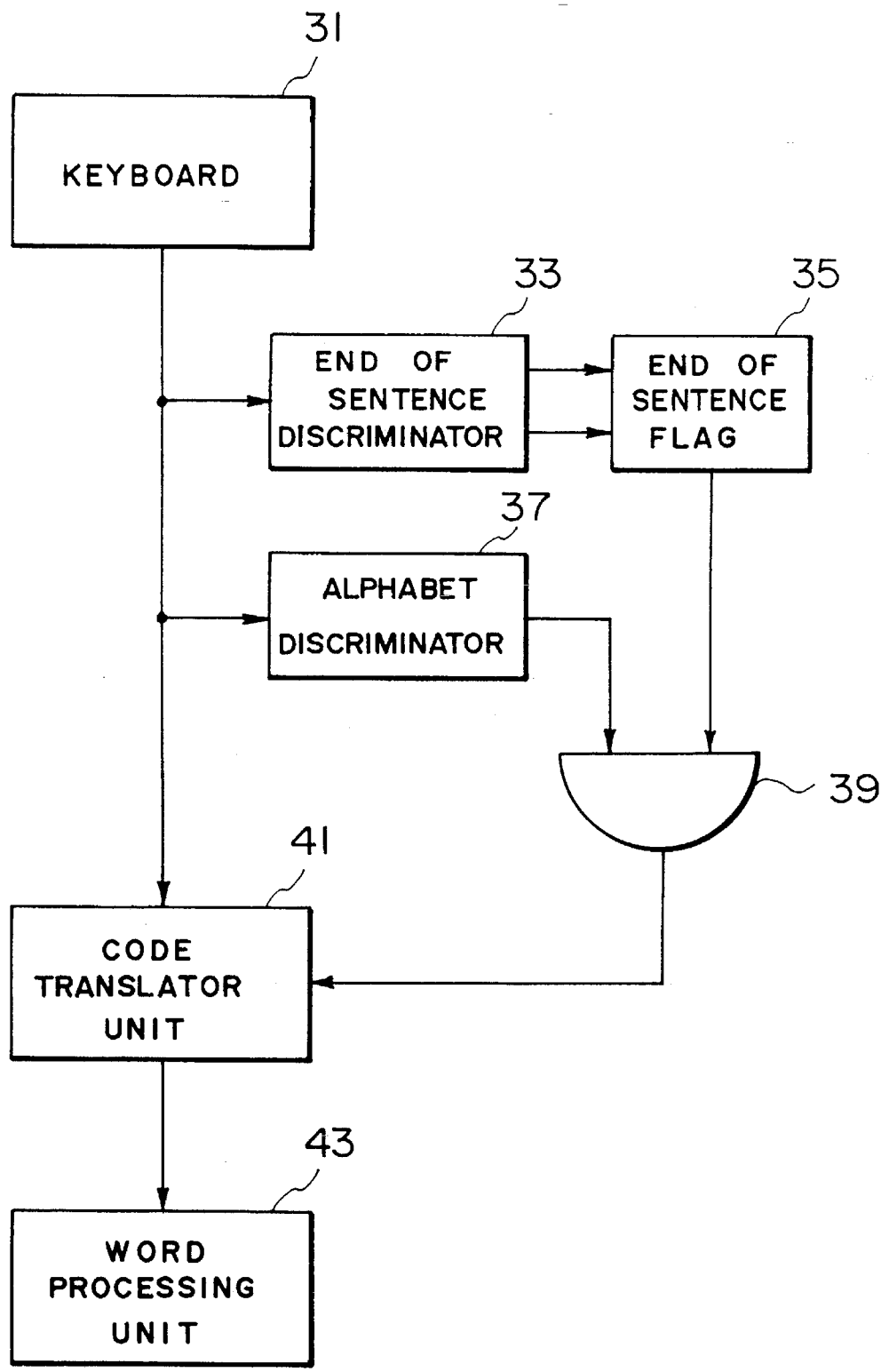
FIG. 3 shows a block diagram of one embodiment of the word processor of the present invention.

FIG. 3 shows one embodiment of the present invention. The present embodiment performs the word processing described in conjunction with FIGS. 1 and 2.

Referring to FIG. 3, the data entered by a keyboard 31 is supplied to an end-of-sentence discriminator 33 which discriminates an equivalence to an end of sentence and sets a flag register 35 when it detects the end of a sentence in the input text data. The end-of-sentence discriminator 33 also discriminates a period code input and a start-of-text-formation code input. An alphabet discriminator 37 discriminates whether the input data from the keyboard 31 is an alphabetic character or not.

An operation when the text shown in FIG. 1 is entered by the keyboard 31 is now explained. In forming a text, a start-of-text-formation key (not shown) is depressed prior to the entry of the text and the end-of-sentence discriminator 33 sets the end of sentence flag 35. Under this condition, a key "h" is depressed and the alphabet discriminator 37 discriminates the alphabetic character and an AND gate 39 supplies an output to a code translator 41. The code translator 41 translates the data from the keyboard 31 to an upper case letter code and supplies it to a word processing unit 43. Thus, the AND gate 39 functions to detect the beginning of a sentence.

Figure 4:
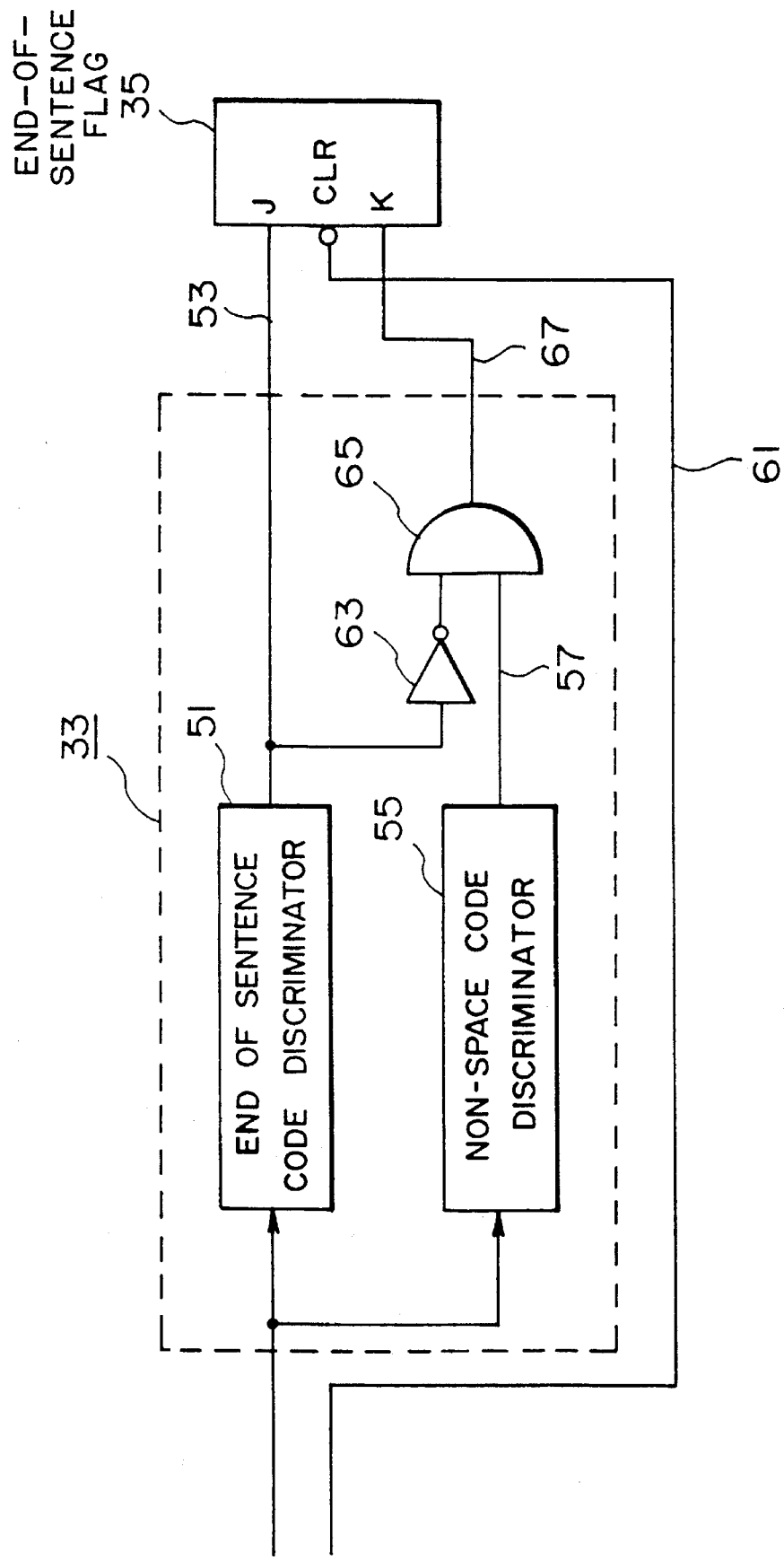
FIG. 4 shows a block diagram of one embodiment of an end of sentence discriminator shown in FIG. 3.

FIG. 4 shows a detail of an end-of-sentence discriminator 33. Referring to FIGS. 3 and 4, the operations of the end-of-sentence discriminator 33 and the end-of-sentence flag 35 are explained in detail. The data from the keyboard 31 is discriminated by an end-of-sentence code, discriminator 51. It discriminates a period code, and a start-of-text-formation code, and if one of those codes is discriminated, it produces a "1" output on a signal line 53 to set the end-of-sentence flag 35. The end-of-sentence flag comprises a J-K flip-flop having a J input terminal thereof connected to the signal line 53. If the input data is a non-space code, a non-space code detector 55 produces a "1" output on a signal line 57. The end-of-sentence flag 35 has a strobe signal line 61 from the keyboard 31 connected to a clear terminal CLR of the J-K flip-flop so that it is set or reset at a trailing edge of a signal on the signal line 61.

The output of the end-of-sentence code discriminator 51 is supplied to one input terminal of an AND gate 65 through an inverter 63, and the signal line 57 is connected to the other input terminal of the AND gate 65. Thus, the AND gate 65 produces a "1" output on a signal line 67 when the output of the end of sentence code discriminator 51 is "0" and the output of the non-space code discriminator 55 is "1". The signal line 67 is connected to a K input terminal of the J-K flip-flop. Accordingly, when the end-of-sentence flag 35 is set by a "1" signal on line 53, the AND gate 65 is not opened even if a space code is input next and the inputs to the K and CLR terminals of the end-of-sentences flag 35 (the J-K flip-flop) are all "0". Therefore, the flag is not reset. If an alphabetic character is inputted under this condition, the AND gate 39 is opened and the code translator 41 translates the input alphabetic code to an upper, case letter code, which is supplied to the word processing unit 43. At a trailing edge in the input alphabet strobe, the end of sentence flag 35 is reset. Accordingly, the subsequent alphabetic codes are supplied to the word processing unit 43 without being translated to the upper case letter codes.

As described hereinabove, according to the present embodiment, the input text can be entered without shifting the beginning of sentence characters to the upper case letters. Accordingly, the troublesome input operation is eliminated and input error is reduced.

Another embodiment of the present invention is now explained.

Figure 5:
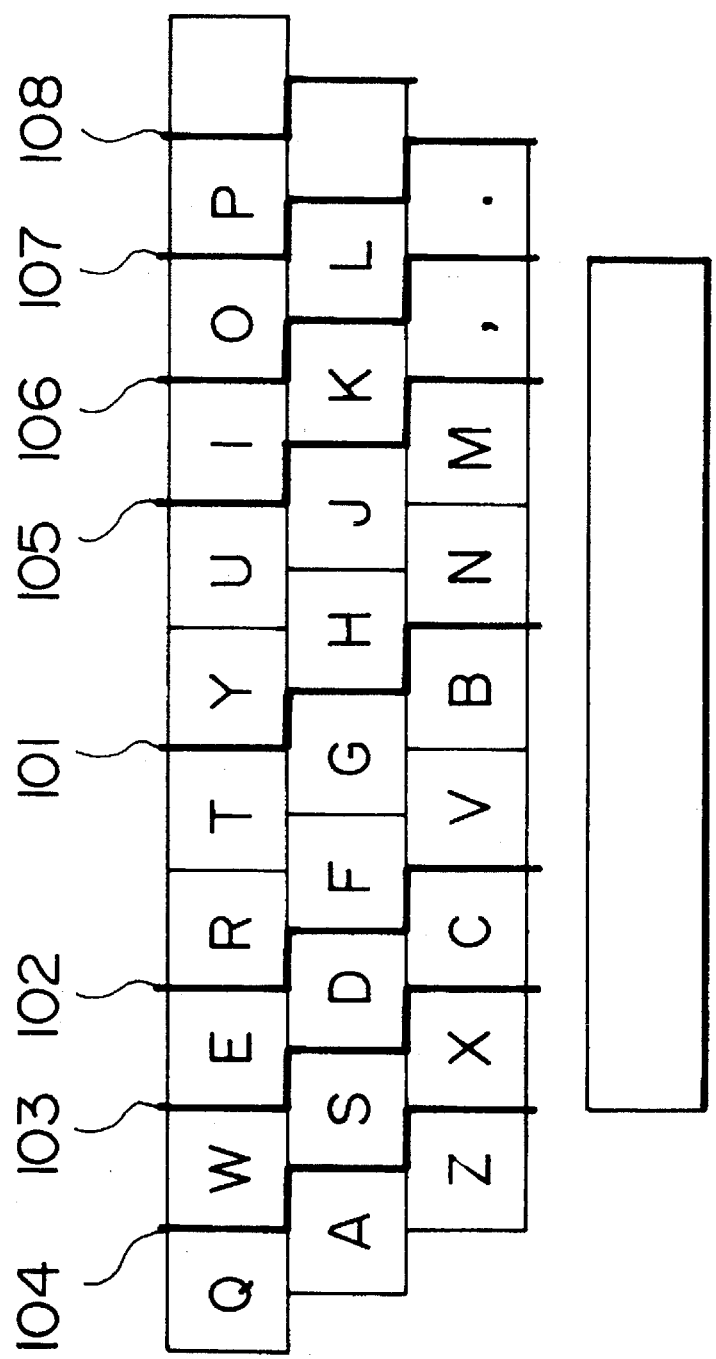
FIG. 5 shows a diagram of character keys of an alphabetic keyboard.

FIG. 5 shows a portion of an alphabetic keyboard. In general, the alphabetic or KANA keyboard does not have many keys and hence the keys are depressed by a touch method in which the keys are depressed without watching the keys. Ten fingers of right and left hands are each preassigned to particular keys. The keys on the left of a boundary line 101 shown in FIG. 5 are to be depressed by the left hand fingers, and the keys on the right are to be depressed by the right hand keys. The keys bounded by the boundary lines 101 and 102 are to be depressed by a forefinger of the left hand, the keys bounded by the boundary lines 102 and 103 are to be depressed by a middle finger of the left hand, the keys encircled by the boundary lines 103 and 104 are to be depressed by a third finger of the left hand and the keys Q, A and Z are to be depressed by a little finger of the left hand. Similarly, for the right hand, the keys bounded by the boundary lines 101 and 105, 105 and 106, 106 and 107, and 107 and 108 are to be deppressed by forefinger, middle finger, third finger and little finger, respectively.

It has been known that an expert keyboard operator occasionally depresses keys for the same fingers of the right hand and the left hand in an incorrect sequence. For example, characters "me" would be keyed as "em". Thus, when the characters on the left and right of the boundary line 101 are to be alternately keyed, the keying sequence may be inverted.

The present invention was made based on a characteristic of the input error described above.

Figure 6:
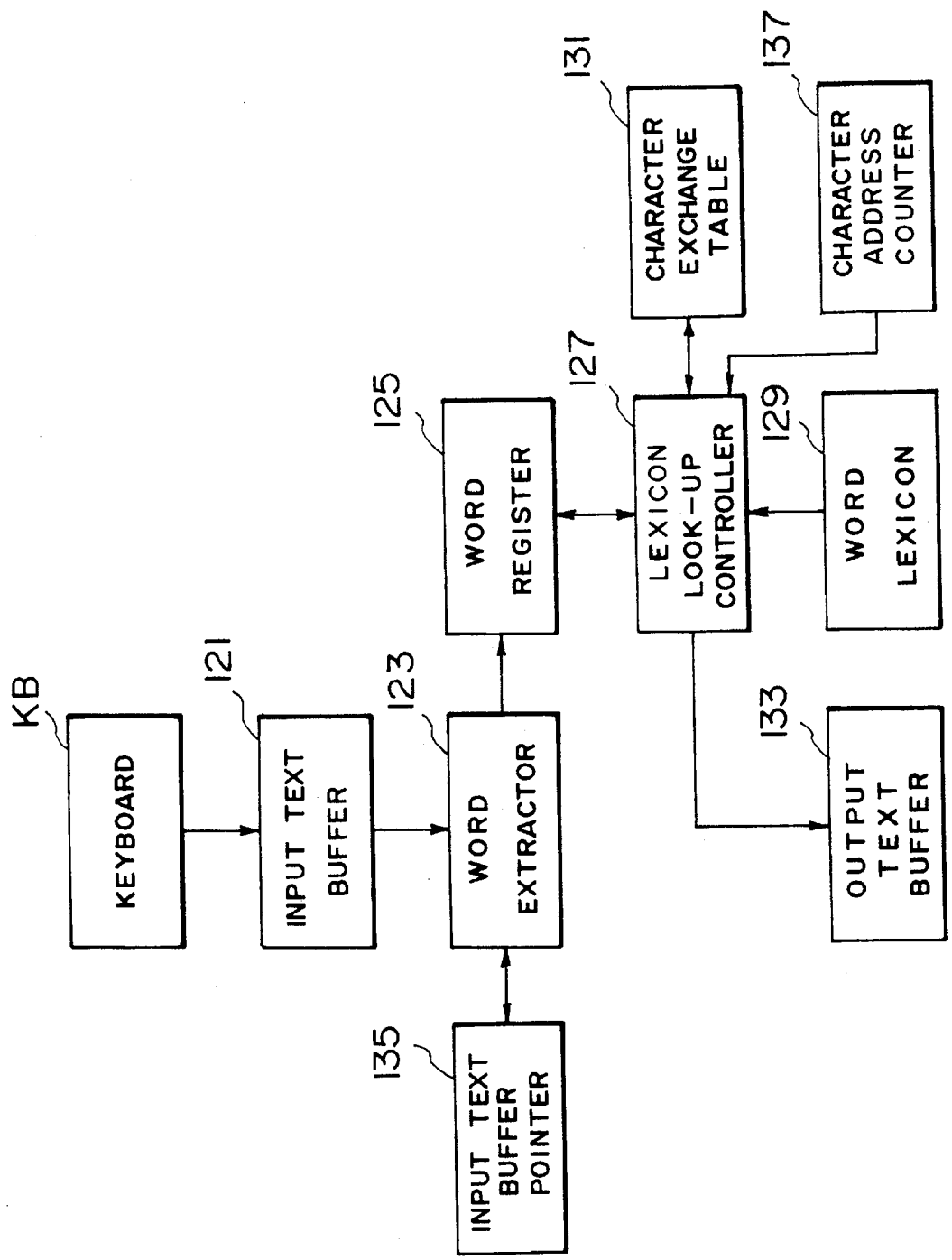
FIG. 6 shows a block diagram of another embodiment of the word processor of the present invention.

FIG. 6 shows one embodiment of the present invention in which a text input by the keyboard KB shown in FIG. 5 is stored in an input text buffer 121. The text stored in the input text buffer 121 is extracted by a word extractor 123 one word at a time. The extracted word is stored in a word register 125 one word at a time. The word stored in the word register 125 is checked by a lexicon look-up controller 127 to determine if the word is found in a word lexicon 129. If it is not found, the constituent characters of the word stored in the word register 125 are exchanged, one character at a time, starting from the last character by referring to a character exchange table 131, and the word lexicon 129 is looked up. If the word is found in the word lexicon 129, it is output to an output text buffer 33.

Figures 7, 9, 10:
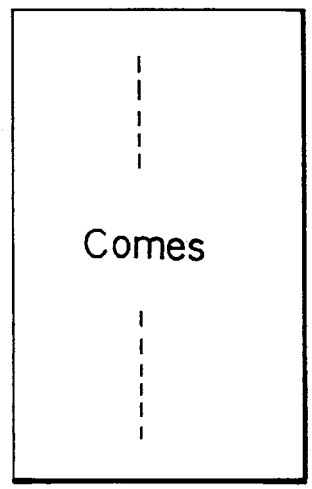
FIG. 7 shows a diagram of a character exchange table.
FIG. 9 shows an example of input text data.
FIG. 10 illustrates a word lexicon.

The character exchange table 31 is constructed as shown in FIG. 7. The respective characters are assigned binary numbers so that the characters on the left and right of the boundary lines 101 of FIG. 5 can be readily identified. The keys to be depressed by the left hands are assigned with "0" while the keys to be depressed by the right hand are assigned with "1".

Figure 8A:
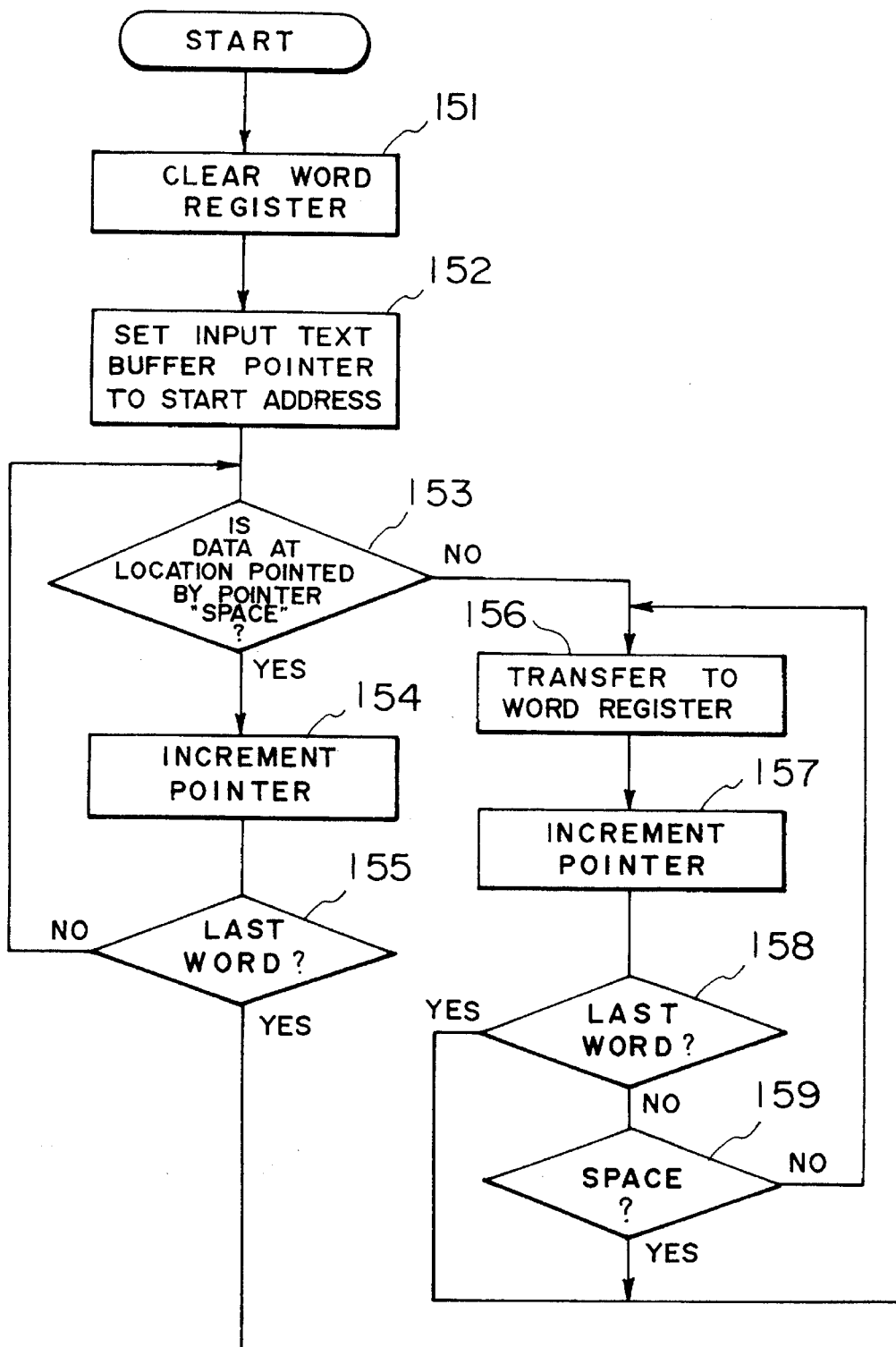
FIGS. 8A, 8B, and 8C are assembled to form a flow chart for operation of the device shown in FIG. 6.
Figure 8B:
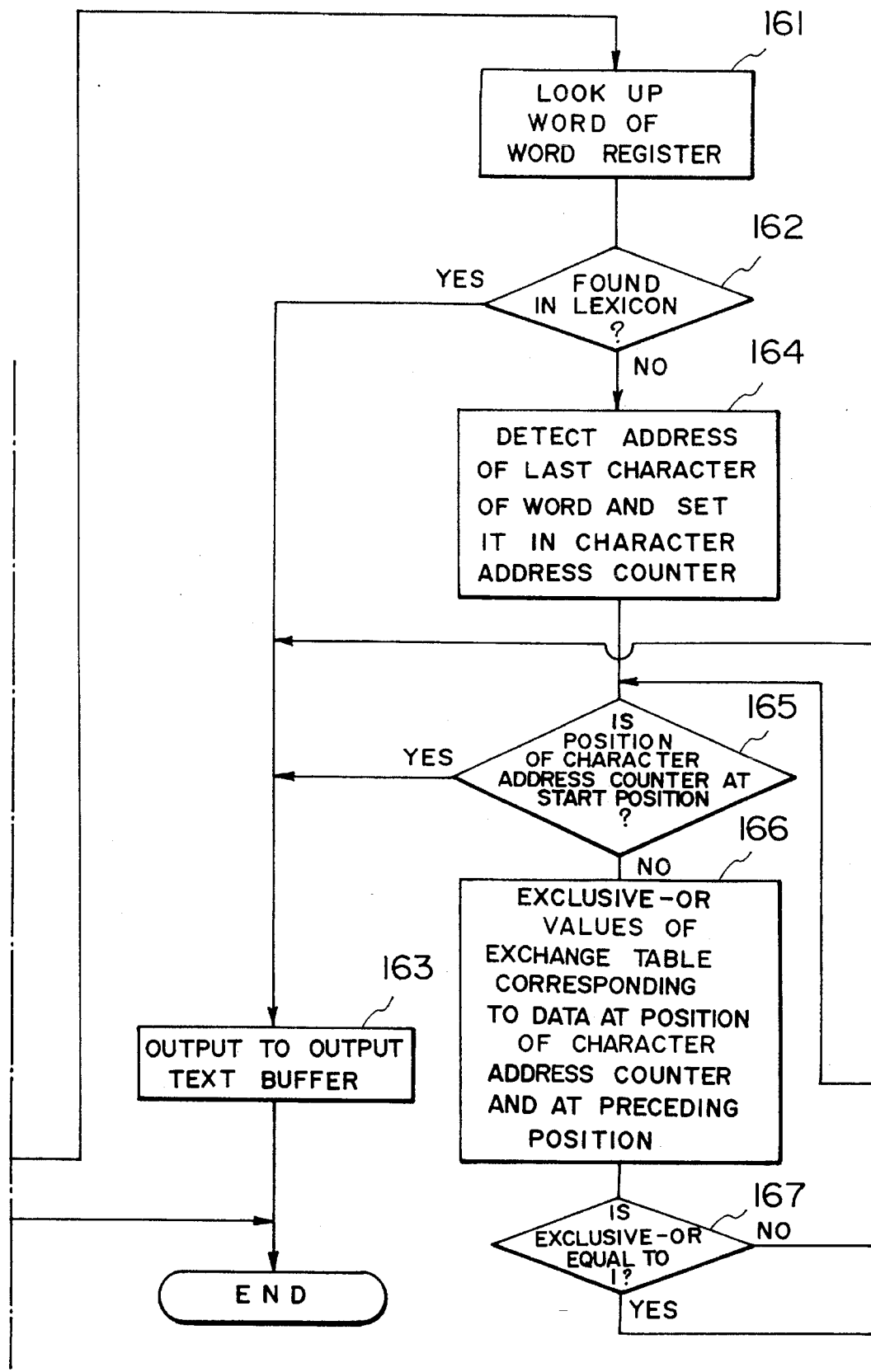
Figure 8:
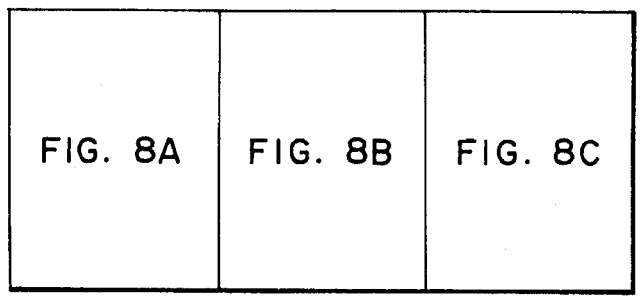
FIG. 8 shows how
Figure 8C:
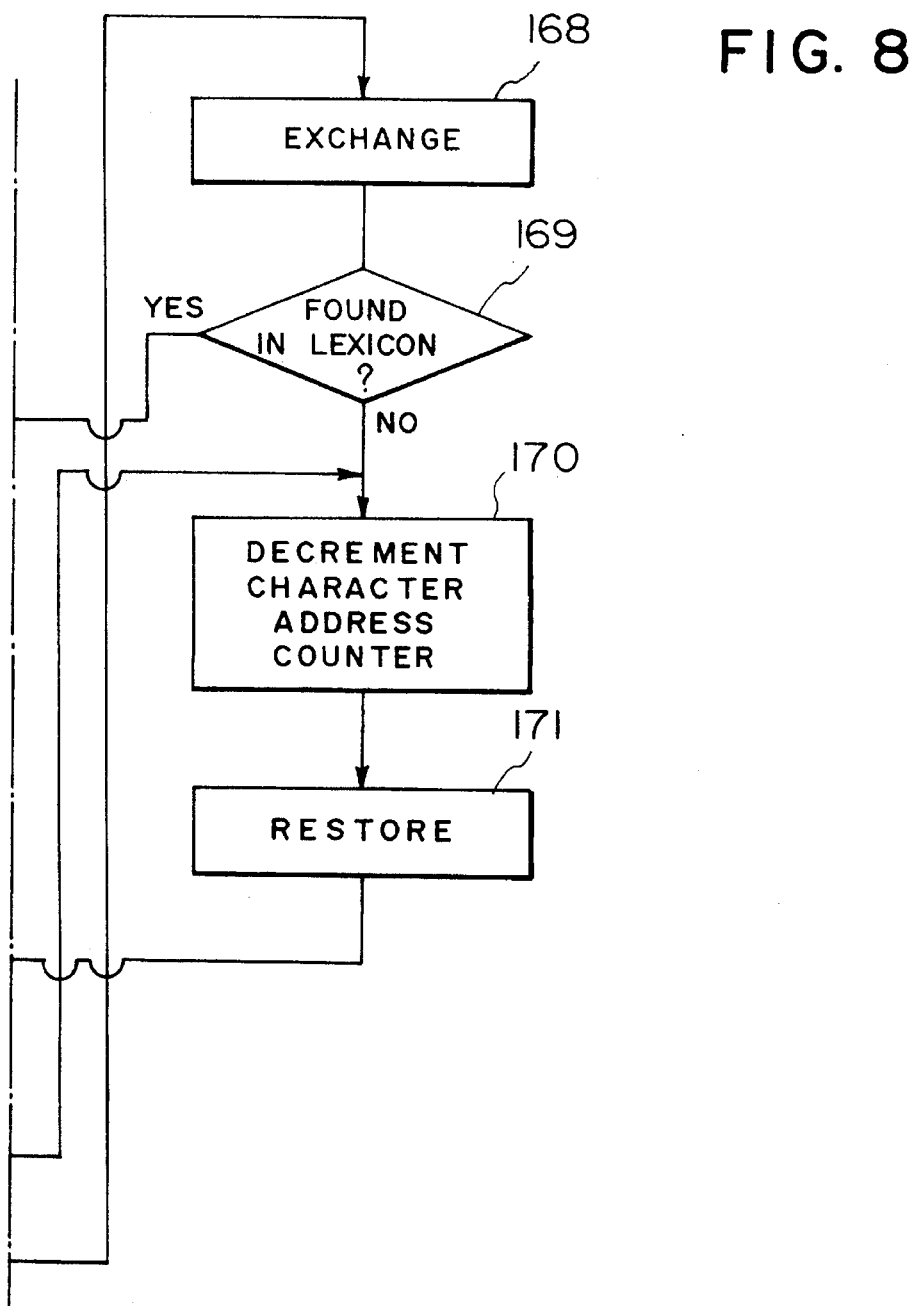

The function of the word extractor 123 shown in FIG. 6 will be now explained in detail with reference to a flow chart shown in FIGS. 8A, 8B and 8C. When the correction of the input sentence is started, the word register 125 is first cleared (step 151). Then, an input text buffer pointer 135 is set to a start address of the sentence (step 152) and it is checked if data at the address pointed by the pointer 135 is a space or not (step 153). If it is a space, the pointer 135 is incremented (step 154) and it is checked if the data is the last word of the sentence stored in the input text buffer 121 (step 155). If it is the last word, the correction is completed. If it is not the last word in the step 155, the process returns to the step 153 to continue the correction.

If a code other than the space code is detected in the step 153, the data pointed by the pointer 135 is transferred to the word register 125 (step 156). Then, the pointer 135 is incremented (step 157) and a decision similar to that of the step 155 is made in a step 158. That is, it is checked if the word stored in the word register 125 is the last word of the sentence stored in the input text buffer 121. If it is not the last word, it is checked if the data pointed by the pointer 135 is a space or not (step 159), and if it is a space, the process shifts to a step 161. If it is not the space, the process returns to the step 156. The words are thus sequentially transferred to the word register 125 through the loop.

If the decisions in the steps 158 or 159 are affirmative, the process shifts to a step 161 and the lexicon look-up controller 127 is activated.

It is now assumed that a text data shown in FIG. 9 is stored in the input text buffer 121 through the operation of the keyboard KB, and a third word $W_3$ "coems" is stored in the word register 125. The word in the word register 125 is looked up in the lexicon (step 161) to check if the word is found in the word lexicon 129 (step 162). If it is found, the word is output to the output text buffer 133 (step 163). In the present example, the word "coems" is not found in the lexicon 129. Thus, the address of the last character of the word is detected and it is stored in a character address counter 137 (step 164).

Then, it is checked if the position specified by the character address counter 137 is a start position of the word (step 165), and if it is the start position, the process shifts to a step 163 where the word stored in the word register 125 is output to the output text buffer 133. In the present example, it is not the start position at the current moment. Thus, the binary number corresponding to the character specified by the character address counter 137 and the binary number corresponding to the immediately preceding character are retrieved by the character exchange table 131 and they are exclusive-ORed (step 166). It is checked if the exclusive-OR function is "1" or not (step 167). In the present example, "s" is assigned with "0" and "m" is assigned with "1", and hence the exclusive-OR function is "1". Accordingly, the character at the position specified by the character address counter 137 and the character at the preceding position are exchanged with each other. In the present example, "s" and "m" are exchanged (step 168). The word "coesm" resulted in by the exchange is looked up in the word lexicon 129 (step 169), and if it is found, the process shifts to the step 163. In the present example, the word is not found in the word lexicon 129. Thus, the character address counter 137 is decremented (step 170). Then, the characters exchanged in the step 168 are returned to the original characters. That is, "5m" are changed to "m5" (step 171).

If the decision in the step 167 is negative, that is, if the exclusive-OR function in the step 166 is "0", the process does not execute the steps 168 and 169 but directly shifts to the step 170.

After the execution of the step 171, the process returns to the step 165 and repeats a similar operation to that described above. In the present example, the character address counter 137 now specifies "m". Thus, the binary numbers for "m" and "e" are retrieved by the exchange table 131 and they are exclusive-ORed (step 166). Since the exclusive-OR function is "1", the process shifts to the step 168 where "m" and "e" are exchanged so that the word "comes" and is looked up in the word lexicon 129 (step 169). Since the word "comes" is found in the word lexicon 129 (see FIG. 10), the process shifts to the step 163 where the word "comes" is output to the output text buffer 133 and the correction is completed.

Through the above check and correction, the incorrect input word due to the transposition of characters resulting from miskeying of the keyboard KB can be corrected. The spelling of word is altered starting from the last character of the word because the input error is less likely for the characters at or near the start position of the word. Accordingly, more efficient correction and easier retrieval are attained.

As described hereinabove, according to the present embodiment, a word processor is provided which easily detects and corrects character transposition error.

A further embodiment of the present invention is now explained.

Figure 11:
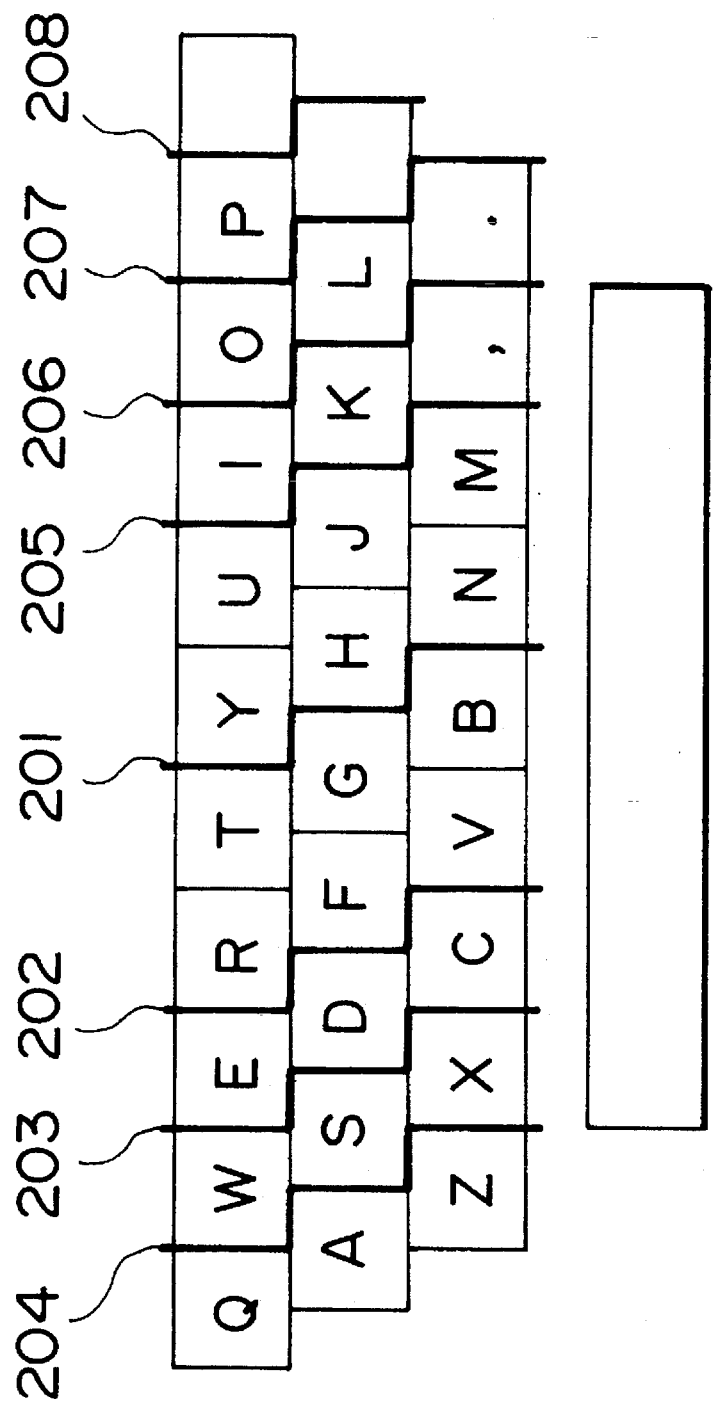
FIG. 11 shows a diagram of character keys of an alphabetic keyboard which are the same as those shown in FIG. 5.

FIG. 11 shows a portion of an alphabetic keyboard which is the same as that shown in FIG. 5. In general, the alphabetic or KANA keyboard does not have many keys and hence the keys are depressed by a touch method in which the keys are depressed without watching the keys. Ten fingers of right and left hands are each preassigned to particular keys. The keys on the left of a boundary line 201 shown in FIG. 11 are to be depressed by the left hand fingers, and the keys on the right are to be depressed by the right hand keys. The keys bounded by the boundary lines 201 and 202 are to be depressed by a forefinger of the left hand, the keys bounded by the boundary lines 202 and 203 are to be depressed by a middle finger of the left hand, the keys bounded by the boundary lines 203 and 204 are to be depressed by a third finger of the left hand and the keys Q, A and Z are to be depressed by a little finger of the left hand. Similarly, for the right hand, the keys bounded by the boundary lines 201 and 205, 205 and 206, 206 and 207, and 207 and 208 are to be depressed by forefinger, middle finger, third finger and little finger, respectively.

It has been known that a beginning keyboard operator occasionally misoperates keys for the same fingers of the right hand and the left hand. For example, the key "R" would be depressed instead of "U". Thus, the keys which are symmetrical with respect to the boundary line 201 may be interchangeably depressed in error.

The present invention was made based on a characteristic of the input error described above.

Figure 12:
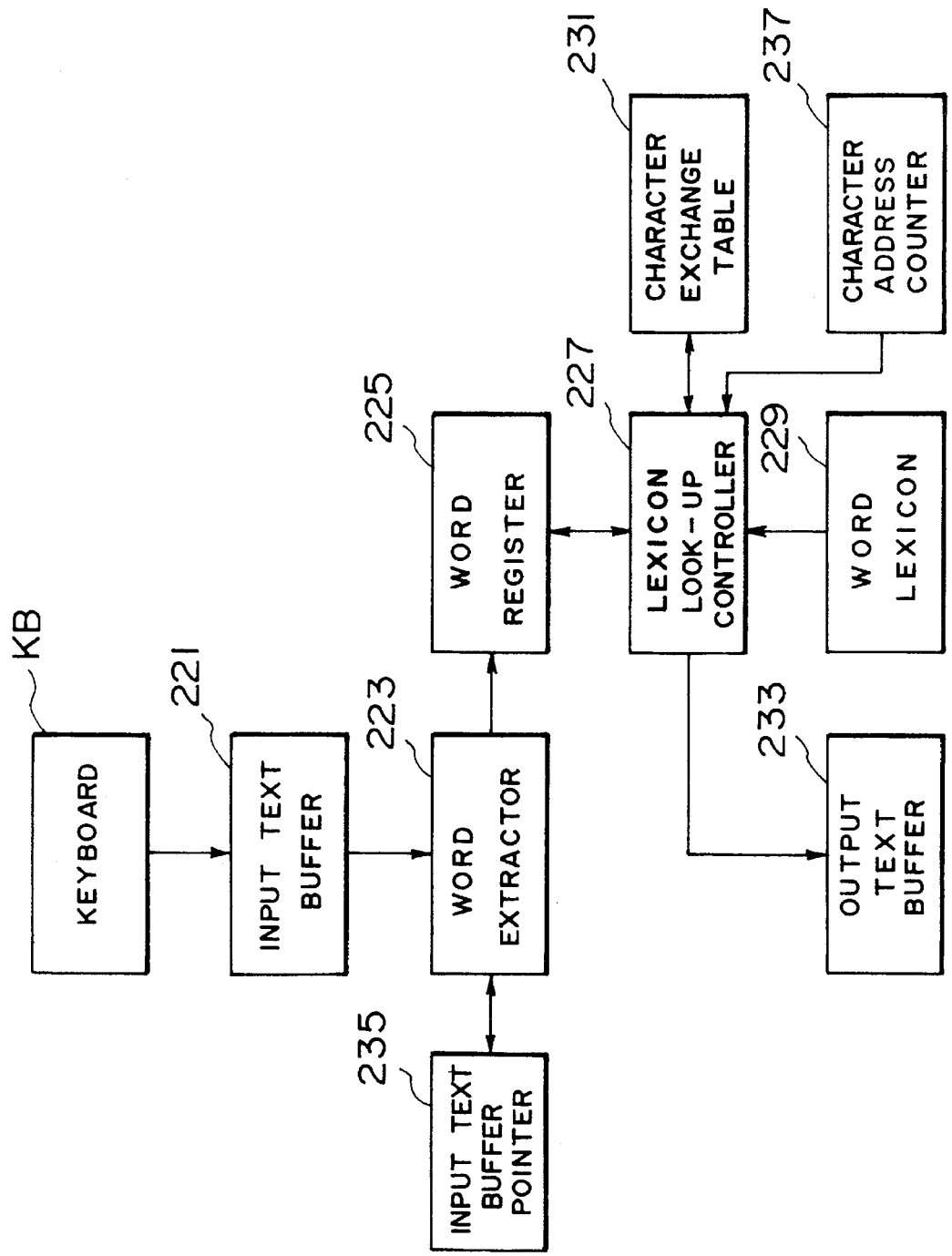
FIG. 12 shows a block diagram of other embodiment of the word processor of the present invention having the same components as the embodiment of FIG. 6 but which operates in different fashion.

FIG. 12 shows one embodiment of the present invention having the same components as the embodiment of FIG. 6. A text input by the keyboard KB shown in FIG. 11 is stored in an input text buffer 221. The text stored in the input text buffer 221 is extracted by a word extractor 223 one word at a time. The extracted word is stored in a word register 225 one word at a time. The word stored in the word register 225 is checked by a lexicon look-up controller 227 to determine if the word is found in an word lexicon 229. If it is not found, the constituent characters of the word stored in the word register 225 are exchanged, one character at a time, starting from the last character by referring a character exchange table 231, and the word lexicon 229 is looked up. If the word is found in the word lexicon 229, it is output to an output text buffer 233.

Figures 13, 15, 16:
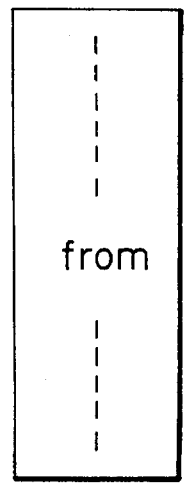
FIG. 13 shows a diagram of a character exchange table.
FIG. 15 shows an example of input text data.
FIG. 16 illustrates a word lexicon.

The character exchange table 231 is constructed as shown in FIG. 13 so that the characters which are symmetric with respect to the boundary lines 201 of FIG. 11 can be readily identified.

Figure 14B:
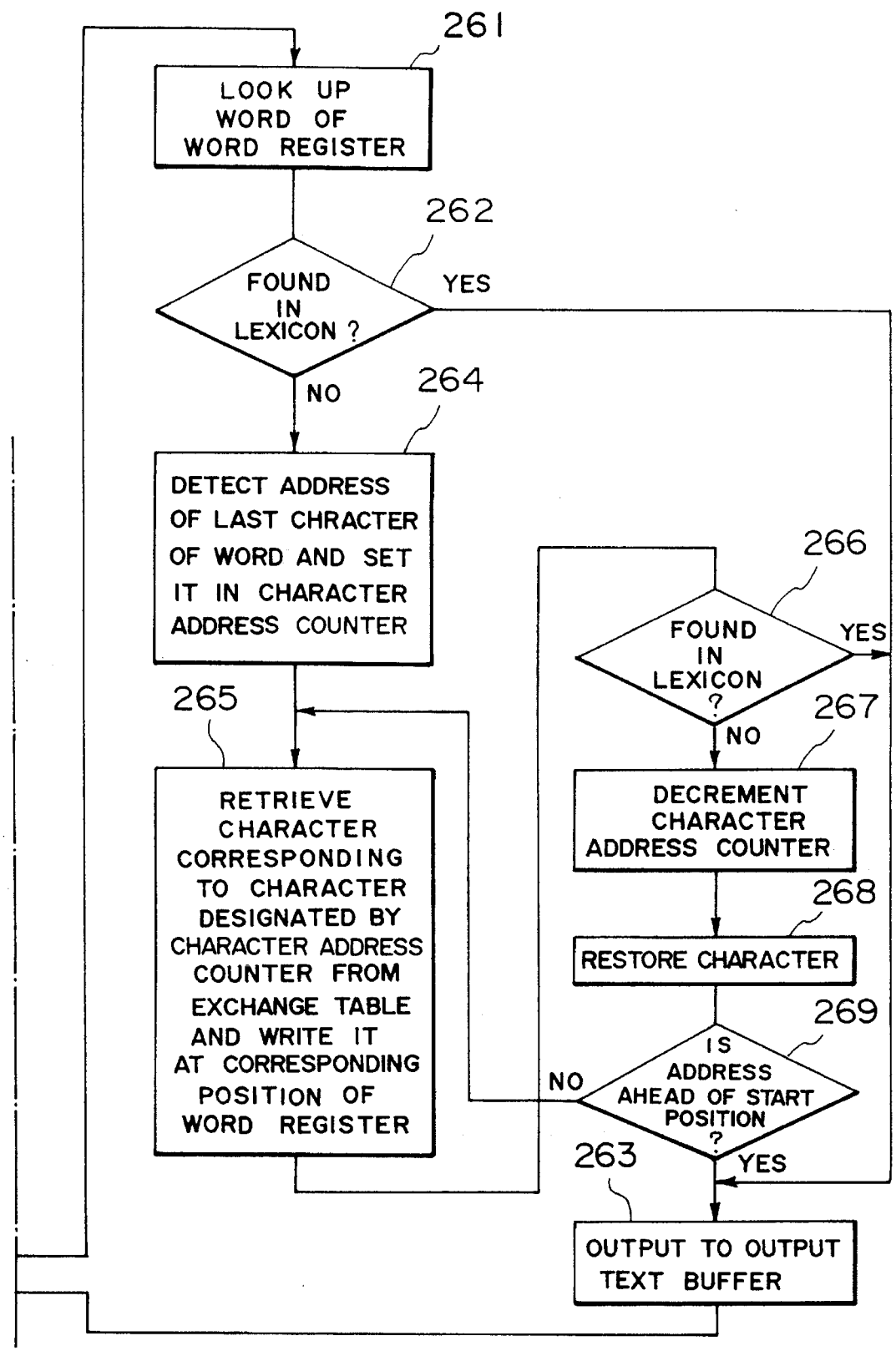

The function of the word extractor 223 shown in FIG. 12 is now explained in detail with reference to a flow chart shown in FIG. 14A and 14B. When the correction of the input sentence is started, the word register 225 is first cleared (step 251). Then, an input text buffer pointer 235 is set to a start address of the sentence (step 252) and it is checked if a data at the address pointed by the pointer 235 is a space or not (step 253). If it is a space, the pointer 235 is incremented (step 254) and it is checked if the data is the last word of the sentence stored in the input text buffer 221 (step 255). If it is the last word, the correction is completed. If it is not the last word in the step 255, the process returns to the step 253 to continue the correction.

If a code other than a space code is detected in the step 253, the data pointed by the pointer 235 is transferred to the word register 225 (step 256). Then, the pointer 235 is incremented (step 257) and a decision similar to that of the step 255 is made in a step 258. That is, it is checked if the word stored in the word register 225 is the last word of the sentence stored in the input text buffer 221. If it is not the last word, it is checked if the data pointed by the pointer 235 is a space or not (step 259), and if it is a space, the process shifts to a step 261. If it is not a space, the process returns to the step 256. The words are thus sequentially transferred to the word register 225 through the loop.

If the decisions in the steps 258 or 259 are affirmative, the process shifts to a step 261 and a lexicon look-up controller 227 is activated.

It is now assumed that a text data shown in FIG. 15 is stored in the input text buffer 221 through the operation of the keyboard KB, and a fourth word $W_4$ "fuom" is stored in the word register 225. The word in the word register 225 is looked up in the lexicon (step 261) to check if the word is found in the word lexicon 229 (step 262). If it is found, the word is outputted to the output text buffer 233 (step 263). In the present example, the word "fuom" is not found in the lexicon 229. Thus, the address of the last character of the word is detected and it is stored in a character address counter 237 (step 264). The character corresponding to the character specified by the character address counter 237 is retrieved by the exchange table 231 and the character "m" at the last position of the word "fuom" is changed to "v" (step 265). The modified word "fuov" is looked up in the lexicon 229 (step 266). If the word is found, the new word is stored in the output text buffer 233 (step 263) and the next word is similarly checked. In the present example, the word "fuov" is not found in the lexicon. Accordingly, the character address counter 237 is decremented (step 267) and "v" changed in the step 265 is rechanged to "m" so that the word stored in the word register 225 is again changed to "fuom" (step 268). Then, it is checked if the address specified by the character address counter 237 is ahead of the start position address (step 269), and if the decision is affirmative, the word is not modified and the process shifts to the step 263.

In the present example, the address is not ahead of the start position address. Thus, the process returns to the step 265 where "0" of the word "fuom" is changed to "w" and the process goes to the step 266. Since the word "fuwm" is not found in the word lexicon 229, the process goes through the steps 266–269 and returns to the step 265. Then, the character "u" of the word "fuom" is retrieved by the exchange table 231 and it is changed to "r" so that the word is changed to "from". Since the word "from" is found in the word lexicon 229 (see FIG. 6), the decision in the step 266 is affirmative and the word is output to the output text buffer 233 in the step 263 and the correction is completed.

Through the above check and correction, the incorrect input word resulting from character substitution error, due to the miskeying of the keyboard KB can be corrected. The spelling of the word is altered starting from the last character of the word because the input error is less likely for the characters at or near the start position of the word. Accordingly, more efficient correction and easier retrieval are attained.

As described hereinabove, according to the present embodiment, a word processor is provided which easily detects and corrects character substitution errors.

What I claim is:

1. An electronic apparatus for forming a text, comprising:

input means for inputting a period code, lower case letter codes, upper case letter codes, a carriage return code, a space code, an end of page code, a start of text formation code, and a non-letter code;

an end of sentence discriminator, connected to said input means, comprising:

an end of sentence code discriminator, connected to said input means, producing a high level end of sentence flag setting signal on an output line thereof when discriminating one of a period code, a carriage return code, an end of page code, and a start of text formation code input by said input means, and producing a low level signal when discriminating the absence of one of the period code, the carriage return code, the end of page code, and the start of text formation code input by said input means;

a non-letter code discriminator, connected to said input means, producing a signal when receiving a non-letter code from said input means;

an inverter, connected to the output line of said end of sentence code discriminator to receive and invert the signal output from said end of sentence code discriminator;

a first AND gate connected to receive the output of said inverter and to receive the signal from said non-letter code discriminator;

a strobe signal line connected to said input means to receive the output therefrom; and a J-K flip flop having J, K, and clear input terminals, wherein the output line of said end of sentence code discriminator is connected to said J input terminal, said strobe signal line is directly connected to said clear input terminal so that said J-K flip flop is set or reset when receiving a trailing edge of a signal on said strobe signal line, and an output line of said first AND gate is connected to said K input terminal, wherein said J-K flip flop outputs an end of sentence flag signal in response to receiving an end of sentence flag setting signal at said J terminal from said end of sentence code discriminator;

an alphabet discriminator, connected to said input means, discriminating the input by said input means of an alphabetic character and producing a signal when the input of an alphabetic character is discriminated;

a second AND gate connected to receive the output from said J-K flip flop and said alphabet discriminator; and a code translator unit connected to receive the output from said input means and said second AND gate, said code translator unit translating a lower case character code received from said input means into an upper case character code when receiving an output from said second AND gate.

2. An electronic apparatus for forming a text, comprising:

input means for inputting a period code, lower case letter codes, upper case letter codes, a space code, and a non-letter code;

an end of sentence discriminator, connected to said input means, comprising:

an end of sentence code discriminator connected to said input means, producing a high level end of sentence flag setting signal on an output line thereof when discriminating a period code is input by said input means and producing a low level signal when discriminating the absence of the period code, input by said input means;

a non-letter code discriminator, connected to said input means, producing a signal when receiving a non-letter code from said input means;

an inverter, connected to the output line of said end of sentence code discriminator to receive and invert the signal output from said end of sentence code discriminator;

a first AND gate connected to receive the output of said inverter and to receive the signal from said non-letter code discriminator;

a strobe signal line connected to said input means to receive the output therefrom; and a status memory having first, second and clear input terminals, wherein the output line of said end of sentence code discriminator is connected to said first input terminal, said strobe signal line is directly connected to said clear input terminal so that said status memory is set or reset when receiving a signal on said strobe signal line, and an output line of said first AND gate is connected to said second input terminal, wherein said status memory outputs an end of sentence flag signal in response to receiving an end of sentence flag setting signal at said first terminal from said end of sentence code discriminator;

an alphabet discriminator, connected to said input means, discriminating the input by said input means of an alphabetic character and producing a signal when the input of an alphabetic character is discriminated;

a second AND gate connected to receive the output from said status memory and said alphabet discriminator;

a code translator unit connected to receive the output from said input means and said second AND gate, said code translator unit translating a lower case character code received from said input means into an upper case character code when receiving an output from said second AND gate.

* * * * *

UNITED STATES PATENT AND TRADEMARK OFFICE
CERTIFICATE OF CORRECTION

PATENT NO. : 5,600,556
DATED : February 4, 1997
INVENTOR(S) : SHUNPEI TAKENAKA

It is certified that error appears in the above-indentified patent and that said Letters Patent is hereby corrected as shown below:

ON THE COVER PAGE:

[54] TITLE:

Line 3, "OF" should read --OF A--.

COLUMN 1:

Line 3, "OF" should read --OF A--.
Line 59, "after" should read --after it is--.

COLUMN 2:

Line 13, "other" should read --another--.
Line 51, "end of sentence" should read --end-of-sentence--.

UNITED STATES PATENT AND TRADEMARK OFFICE
CERTIFICATE OF CORRECTION

PATENT NO. : 5,600,556
DATED : February 4, 1997
INVENTOR(S) : SHUNPEI TAKENAKA

Page 2 of 4

It is certified that error appears in the above-indentified patent and that said Letters Patent is hereby corrected as shown below:

COLUMN 3:

Line 13, "end of sentence" should read --end-of-sentence--.
Line 21, "inputted" should read --input--.
Line 23, "upper, case" should read --upper case--.
Line 25, "end of sentence" should read --end-of-sentence--.
Line 40, "Ten" should read --The--, and "of" should read --of the--.
Line 44, "keys." should read --fingers.--.
Line 45, "a" should read --the--.
Line 47, "a" should read --the--.
Line 48, "encircled" should read --bounded--.
Line 49, "a" should read --the--.
Line 50, "a" should read --the--.
Line 53, "deppressed" should read --depressed--.

UNITED STATES PATENT AND TRADEMARK OFFICE
CERTIFICATE OF CORRECTION

PATENT NO. : 5,600,556          Page 3 of 4
DATED      : February 4, 1997
INVENTOR(S): SHUNPEI TAKENAKA It is certified that error appears in the above-indentified patent and that said Letters Patent is hereby corrected as shown below:

COLUMN 4:

Line 10, "word" should read --word is looked up in the-- and "129 is looked up." should read --129.--.
    Line 17, "hands" should read --hand--.

COLUMN 5:

Line 16, ""5m"" should read --"sm"--.
    Line 17, ""m5"" should read --"ms"--.
    Line 29, delete "and".
    Line 51, "ten" should read --The--.
    Line 53, "a" should read --the--.
    Line 55, "keys." should read --fingers.--.
    Line 58, "a" should read --the--.
    Line 60, "a" should read --the--.
    Line 62, "a" should read --the--.

UNITED STATES PATENT AND TRADEMARK OFFICE
CERTIFICATE OF CORRECTION

PATENT NO. : 5,600,556
DATED : February 4, 1997
INVENTOR(S) : SHUNPEI TAKENAKA

It is certified that error appears in the above-indentified patent and that said Letters Patent is hereby corrected as shown below:

COLUMN 6:

Line 17, "an" should read --the--.
  Line 20, "referring" should read --referring to--.
  Line 21, "word" should read --word is looked up in the--, and "129 is looked up." should read --129.--.
  Line 26, "lines" should read --line--.
  Line 34, Delete "a".
  Line 63, "outputted" should read --output--.

COLUMN 7:

Line 18, ""O"" should read --"o"--.

COLUMN 8:

Line 40, Delete "is".

Signed and Sealed this

Fifth Day of August, 1997

Attest:

BRUCE LEHMAN

Attesting Officer

Commissioner of Patents and Trademarks